Patented Dec. 15, 1925.

1,565,891

UNITED STATES PATENT OFFICE.

LOUIS BENDA, OF MAINKUR, NEAR FRANKFORT-ON-THE-MAIN, AND OTTO SIEVERS, OF FECHENHEIM-ON-THE-MAIN, GERMANY, ASSIGNORS TO LEOPOLD CASSELLA & CO. GESELLSCHAFT MIT BESCHRÄNKTER HAFTUNG, A CORPORATION OF GERMANY.

PRODUCTION OF ACRIDINIUM COMPOUNDS.

No Drawing. Application filed December 22, 1923. Serial No. 682,305.

*To all whom it may concern:*

Be it known that we, LOUIS BENDA, a citizen of the Swiss Confederation, residing at Mainkur, near Frankfort-on-the-Main, Germany, and OTTO SIEVERS, a citizen of the German Empire, residing at Fechenheim-on-the-Main, Germany, have invented certain new and useful Improvements in the Production of Acridinium Compounds, of which the following is a full description.

We have found that alkoxyacridines, as for instance, 3.6-dialkoxyacridine (described in the application Serial No. 634,895) may be alkalated in the acridine nitrogen, if alkylation is carried out in the absence of acid binding agents.

According to this invention therefore new acridinium compounds are produced by alkylating an alkoxyacridine in the acridine nitrogen with any one of the known alkylating agents.

In consequence of their high bactericidal property and low toxicity, the new acridinium compounds are excellent antiseptics, their character as dyestuffs is hardly apparent and so they contrast favorably with the corresponding aminoacridinium compounds. They are more soluble and have greater power of diffusion than the salts of 3.6-dimethoxyacridine, 3.6-diethoxyacridine, 3.6-dihydroxyethylacridine and other acridine compounds of the application No. 634,895 of April 26th, 1923.

*Example 1.—3.6-dimethoxy-10-methylacridiniumchloride.*

8.6 kg. 3.6-dimethoxyacridine (see application Serial No. 634,895) are dissolved in 80 litres nitrobenzene which has been heated to 180° C. and 8.6 kg. p-toluene sulphonic acid methylester at 170–175° C. are added. The clear solution is boiled for 10 minutes. On cooling, the crystals separate. After allowing to stand for 12 hours and decanting by suction, the toluene-sulfonate is transformed into the chloride by boiling with dilute hydrochloric acid. After filtering, fine scales of a golden lustre crystallize out.

Additional quantities of the compound are obtained from the alkalating filtrate by distilling the nitrobenzene with steam, preferably with the addition of some hydrochloric acid, the toluenesulfonic acid compound being simultaneously transformed into the methyl chloride.

It forms light yellow scales, with a golden lustre, insoluble in ether, benzene, naphtha, difficultly soluble in acetone, soluble in glacial acetic acid or alcohol, easily soluble in methanol. Ether precipitates the methyl chloride from its methanol solution.

*Example 2. — 3.6-dimethoxy-10-ethylacridiniumchloride.*

4.8 kg. 3.6-dimethoxyacridine are dissolved in 40 litres nitrobenzene heated to 150° C., and 5.5 kg. p-toluene sulfonic acid ethylester at 145–150° C. are added. The temperature is maintained at 145–150° C. for half an hour, and after cooling down, the mixture is poured into an excess of dilute hydrochloric acid. The crystals formed are separated, washed with dilute hydrochloric acid and recrystallized twice out of 15 litres water as orange yellow scales with a golden lustre and of a very bitter taste, which melt and decompose at 198° C. They are soluble in glacial acetic acid and alcohol and insoluble in ether, ligroine, chloroform and benzene.

*Example 3.—3.6-dimethoxy-10-benzylacridiniumchloride.*

4.8 kg. 3.6-dimethoxyacridine are dissolved in 40 litres nitrobenzene heated to 150° C. and 3 kg. benzyl chloride are added. After heating for half an hour to 150° C. small crystals separate on cooling. The mixture is poured into an excess of dilute hydrochloric acid and the crystals are separated. After recrystallizing out of water twice, the pure compound is obtained as dark yellow needles of a bitter taste, melting and decomposing at 236° C. They are soluble in alcohol, glycerine, acetic acid, but insoluble in ether, chloroform, benzene.

*Example 4. — 3.6-dimethoxy-10-hydroxyethylacridiniumchloride.*

4.8 kg. 3.6-dimethoxyacridine are added to 40 litres nitrobenzene heated to 125° C. To this solution 2.5 kg. ethylenechlorhydrin are carefully added and the whole is gradually heated to near the boiling point. On cooling, no crystals precipitate, but after pouring into an excess of dilute hydrochloric acid crystals are formed and separated. After recrystallizing out of water twice, the pure compound is obtained as pale yellow needles, melting and decomposing at 240–242° C. They are easily soluble in alcohol, ethylenechlorhydrin or acetic acid but insoluble in benzene, ligroine and chloroform.

Having now particularly described and ascertained the matter of our said invention and in what manner the same is to be performed, we declare that what we claim is:

Claims:

1. As new substances alkoxy-10-alkylacridinium compounds.

2. As new substances 3.6-dialkoxy-10-alkylacridinium compounds the constitution of which corresponds to the formula:

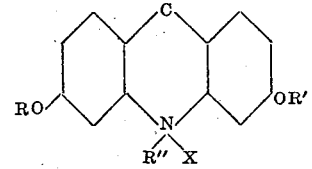

in which formula R, R′, R″, mean "alkyl" and X means an anion, being yellow to orange crystals, soluble in water, acetic acid, alcohol, insoluble in benzene, chloroform, ligroine.

In witness whereof we have hereunto signed our names this 30th day of November, 1923.

LOUIS BENDA.
OTTO SIEVERS.